United States Patent
Saliba (10) Patent No.: US 7,124,124 B1
(45) Date of Patent: Oct. 17, 2006

(54) DATA STORAGE DEVICES FOR LARGE SIZE DATA STRUCTURES

(75) Inventor: George A. Saliba, Northboro, MA (US)

(73) Assignee: Quantum Corporation, San Jose, CA (US)

( * ) Notice: Subject to any disclaimer, the term of this patent is extended or adjusted under 35 U.S.C. 154(b) by 982 days.

(21) Appl. No.: 09/577,637

(22) Filed: May 24, 2000

Related U.S. Application Data (60) Provisional application No. 60/135,646, filed on May 24, 1999.

(51) Int. Cl.
*G06F 17/30* (2006.01)

(52) U.S. Cl. .......................... 707/1; 707/100

(58) Field of Classification Search ............ 707/1–10, 707/100–104.1, 200–205; 711/4, 133, 136, 711/177; 369/95, 24.01, 30.1, 30.21, 30.03
See application file for complete search history.

(56) References Cited

U.S. PATENT DOCUMENTS

| | | | | |
|---|---|---|---|---|
| 4,445,195 | A * | 4/1984 | Yamamoto | 358/403 |
| 5,403,639 | A * | 4/1995 | Belsan et al. | 707/204 |
| 5,485,321 | A | 1/1996 | Leonhardt et al. | |
| 5,551,003 | A | 8/1996 | Mattson et al. | |
| 5,734,891 | A * | 3/1998 | Saigh | 707/10 |
| 5,892,633 | A | 4/1999 | Ayres et al. | |
| 6,195,727 | B1 | 2/2001 | Islam et al. | |

FOREIGN PATENT DOCUMENTS

| | | |
|---|---|---|
| EP | 0 795 862 A2 | 9/1997 |
| EP | 1 158 517 A2 | 11/2001 |
| JP | 11306690 | 5/1999 |
| WO | WO 95/34892 | 12/1995 |
| WO | WO 98/03968 | 1/1998 |

OTHER PUBLICATIONS

European Search Report dated Mar. 30, 2004, for EP patent application No. EP 03 25 7394 filed on Nov. 24, 2003 (3 pages).

European Search Report completed on Dec. 22, 2004 and mailed on Jan. 3, 2005, for EP patent application No. 03257395.8, filed on Nov. 24, 2003: 3 pages.

"Partitioning of a Video Tape" (Jun. 1, 1997) Research Disclosure, Kenneth Mason Publications: Hampshire GB, No. 398: p. 395.

* cited by examiner

*Primary Examiner*—Mohammad Ali
(74) *Attorney, Agent, or Firm*—Morrison & Foerster LLP (57) ABSTRACT

A data storage device includes a recording head assembly having a recording head and a servo head operatively connected to the recording head, a recording medium capable of being positioned relative to the recording head assembly for recording data in a longitudinal recording direction, and a control interface for receiving data of a file to be recorded on the recording medium and positioning information for positioning the recording medium relative to the recording head assembly. The file data is recorded on the recording medium as a logical ring located within a logical cylinder spanning a finite length on the recording medium, with all data for the file being stored in a single logical ring on a single recording medium. The logical cylinder occupies a portion of the single recording medium.

31 Claims, 5 Drawing Sheets

DATA STORAGE DEVICES FOR LARGE SIZE DATA STRUCTURES

CROSS-REFERENCE TO RELATED APPLICATIONS

This application claims the benefit of the U.S. Provisional Application No. 60/135,646 having a filing date of May 24, 1999.

FIELD OF THE INVENTION

The systems and methods described herein relate to data storage devices, and more particularly, to data storage devices suitable for storing large size data structures, such as multi-megabyte data files.

BACKGROUND OF THE INVENTION

Today, we are experiencing an exponential growth in the amount of data being stored in a digital format. In part, this exponential growth can be attributed to the proliferation of the Internet, which has made the duplication and distribution of large data files remarkably easy. For example, the Internet has become a common medium for distributing multimedia data files, such as movie trailers. These multimedia data files are large data structures, typically on the scale of 1 to 10 megabytes. Although conventional data storage mechanisms, such as hard disk drives and linear tape storage systems, can be employed for storing such large data files, neither of these existing technologies is particularly well suited for this application.

For example, hard disk drive systems are well suited for storing small data files that need to be rapidly accessed. However, hard disk systems become less efficient as file size increases. Specifically, as the size of the data file increases, a problem known as fragmentation arises. Fragmentation occurs because hard disk systems break data files into smaller subsections, typically 512 bytes each, and store the subsections where space is available on the disk. Initially, the subsections are often stored closely together on the disk surface, and this allows the read/write head of the drive to quickly access the different subsections and retrieve the entire file from the disk. However, over time, as the file is read off the disk, edited and rewritten to the disk, the subsections become scattered over the surface of the disk. This effect is known as fragmentation. Over time it is quite common that the individual sub-sections of a large data file become dispersed widely across the surface of the disk. This wide separation of sub-sections increases the time it takes to assemble a data file as the read/write head must move across large sections of the disk, multiple times, to be able to access each sub-section of the file being accessed. Accordingly, for large data files stored on a hard drive, data fragmentation can cause the file access time to increase substantially, such as from milliseconds to seconds.

Similarly, tape data storage systems lack an architecture that is well adapted for retrieving files from large size data structures. In particular, linear tape storage systems write data onto a storage tape in a long continuous stream, creating a long track that may extend lengthwise across the entire tape and may be composed of multiple data files. This track continues for file after file, with each new file being appended to the existing track. Thus, each new file begins where the last file ended, and the track is continually extended. Retrieval of data from such linearly recorded tapes may take minutes to fractions of an hour.

In another type of conventional tape storage system, data can be stored in a "serpentine" fashion as device blocks in a pattern that bi-directionally traverses the tape's length along different parallel tape tracks. Using the "serpentine" data storage pattern, the data can be congregated on all tracks as close to the beginning of the tape as possible. Another system "partitions" the tape by pre-formatting a magnetic tape medium into evenly spaced multi-track segments. Larger-sized partitions for longer files can be formed by joining adjacent segments. The partitions may be automatically padded with a selected number of empty segments to allow for file expansion, for example, after editing.

Although these architectures are well suited for quickly storing large files, they are not well suited for allowing these files to be accessed, edited and rewritten to the tape. Specifically, if a file is accessed and edited, its length will change and it may no longer fit in its prior space between the files that previously bounded it. Thus the system can only append files to the track, causing new files to be written to new locations on the tape each time a file is saved. This of course can quickly use up storage space, particularly if large files are being edited.

Moreover, file access time for a tape system is typically measured in seconds or minutes as the linear tape storage system must roll through large lengths of tape before being positioned at the location of a particular file. Accordingly, tape backup systems, although excellent for long term storage of large data files, are poorly suited for providing convenient read/write access of data.

Thus, there is a need in the art for a data storage system that is suitable for providing reliable read/write access to large size data structures, and to provide such access within a reasonable time.

SUMMARY OF THE INVENTION

The systems and methods described herein provide data storage devices and techniques for storing large size data structures. To this end, the systems of the invention include data storage devices that store data files as logical cylinders that can be written to and read from a recording media. Each data file is stored on the recording media as a track of continuous data. The recording media can be subdivided into a plurality of separate track locations, each of which can be employed for storing a single data file. As will be described herein, the systems of the invention can access each logical track independently, thus allowing each stored file to be altered independently, without requiring other files stored on the media to be reorganized or rearranged. Moreover, since the file structure is provided as a continuous track of data, the file structure is always intact, and data fragmentation is avoided. Furthermore, as the continuous track of data is located within a comparatively small length of tape, file access for a large file, such as a file of one to ten megabytes, has a competitive access time as minimal seek time is required.

According to one aspect of the invention, a method is provided for configuring a tape storage medium for recording a data file having a finite size, wherein the method includes defining a logical cylinder on the storage medium, the cylinder comprising at least one storage ring, and recording on one of the at least one storage rings the data file. A length of the logical cylinder is dynamically allocated based on the size of the data file.

According to another aspect of the invention, a method is disclosed for storing on a storage medium a data file of finite size, which includes determining the size of the data file, determining from the size of the data file a length of a storage ring on the storage medium for recording the file on the storage ring, and defining on the storage medium a logical cylinder to accommodate the storage ring on the logical cylinder.

According to yet another aspect of the invention, a magnetic tape data storage system for storing a data file is disclosed which includes a magnetic tape having a longitudinal recording direction and a plurality of transversely spaced logical tracks, at least one logical cylinder extending along the longitudinal recording direction, and at least one data storage ring located entirely within a respective logical cylinder. The data file is recorded in its entirety on a single data storage ring.

According to still another aspect of the invention, a data storage device includes a recording head assembly having a recording head and a servo head operatively connected to the recording head. The data storage device further includes a recording media capable of being positioned relative to the recording head assembly for recording data in a longitudinal recording direction, and a control interface receiving data of a file to be recorded on the recording media and positioning information for positioning the recording media relative to the recording head assembly. The file data are recorded on said recording media in the form of a logical ring located within a logical cylinder spanning a finite length on the recording media, with the data of the entire file stored in a single ring.

DESCRIPTION OF THE ILLUSTRATED EMBODIMENTS

Figure 1A:
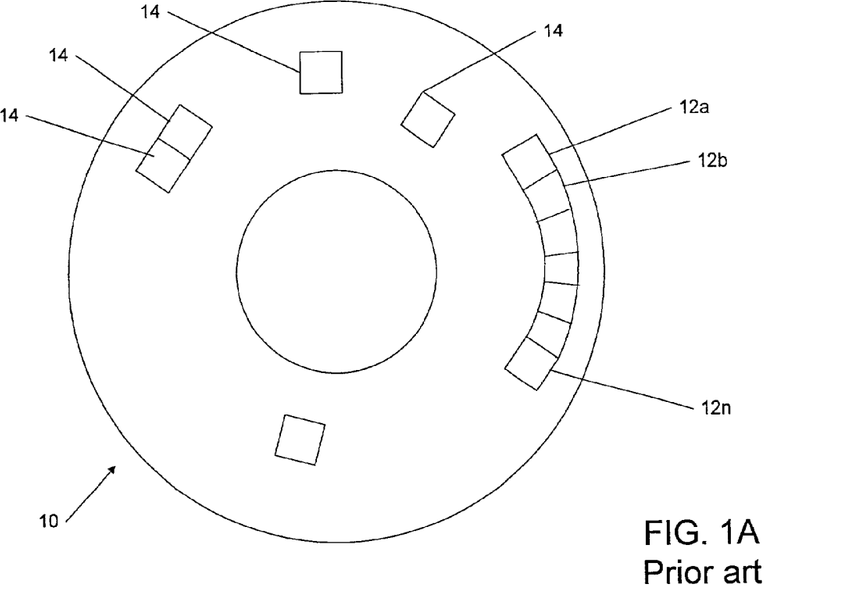
FIGS. 1A through 1C depict three prior art systems for storing data on media.
Figure 1B:
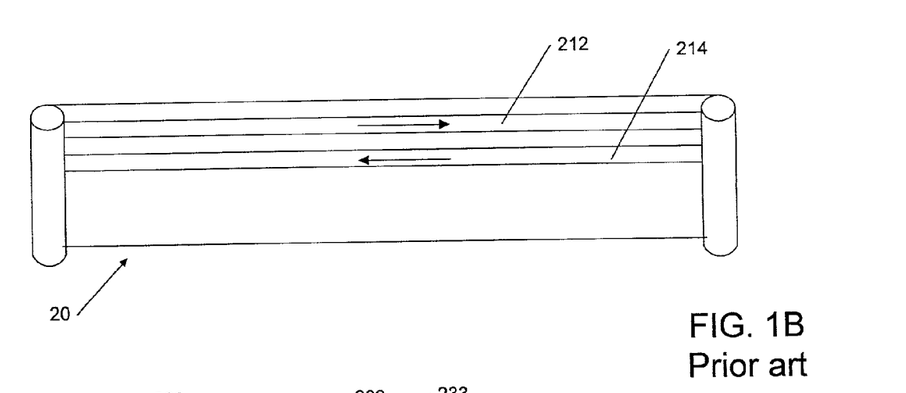
Figure 1C:
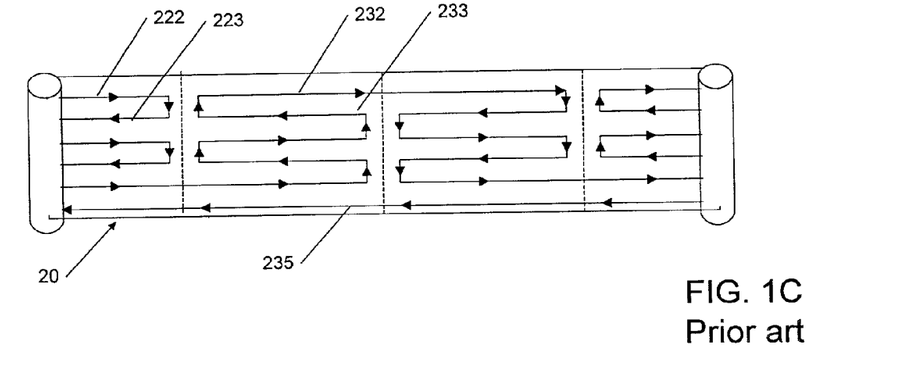

FIGS. 1A–1C depict three exemplary prior art techniques for storing data on to a recording medium. FIG. 1A depicts a traditional disk storage system 10 wherein a data file is subdivided into a plurality of fragments 12a, 12b, . . . , 12n, 14, each of which is typically 512 bytes in size. Initially, the disk system may select locations 12a, 12b, . . . , 12n for the different data fragments that are close together, typically trying to store the data in a continuous block of locations. However, as files are accessed, edited, and rewritten to the disk, the disk system may not be able to store each of these data fragments as a contiguous record because subsequent locations on the track are already occupied. The data fragments may then be stored at separate locations 14 on the disk until the entire file is stored. The distance between data fragments can increase with the number of times the data are rewritten to the disk, thereby also increasing the file access time which is the time it takes for the disk system to seek and locate all the necessary data fragments. This becomes particularly problematic with large files.

FIGS. 1B and 1C depict exemplary prior art techniques of storing data files on a magnetic tape 20. The data can be stored in a continuous linear logical track 212, 214 or as a serpentine track with serpentine segments 222, 223, 232, 233, . . . , 235. Each track is understood to represent a logical track which may include a plurality of physical tracks, such as 8–16 physical tracks. Each file is contiguous with the surrounding files, and may include "padding." However, if a file is read from the tape and edited, it may not be possible to write the edited file to its previous location on the tape if the length of the file has increased after editing, as this may cause the rewritten file to overwrite a portion of the next file in the track. Accordingly, although the tape system is well suited for providing long term storage of large data files, particularly as it avoids data fragmentation, the tape system is poorly suited as a memory device for storing files that are to be accessed and edited from time to time.

Figure 2:
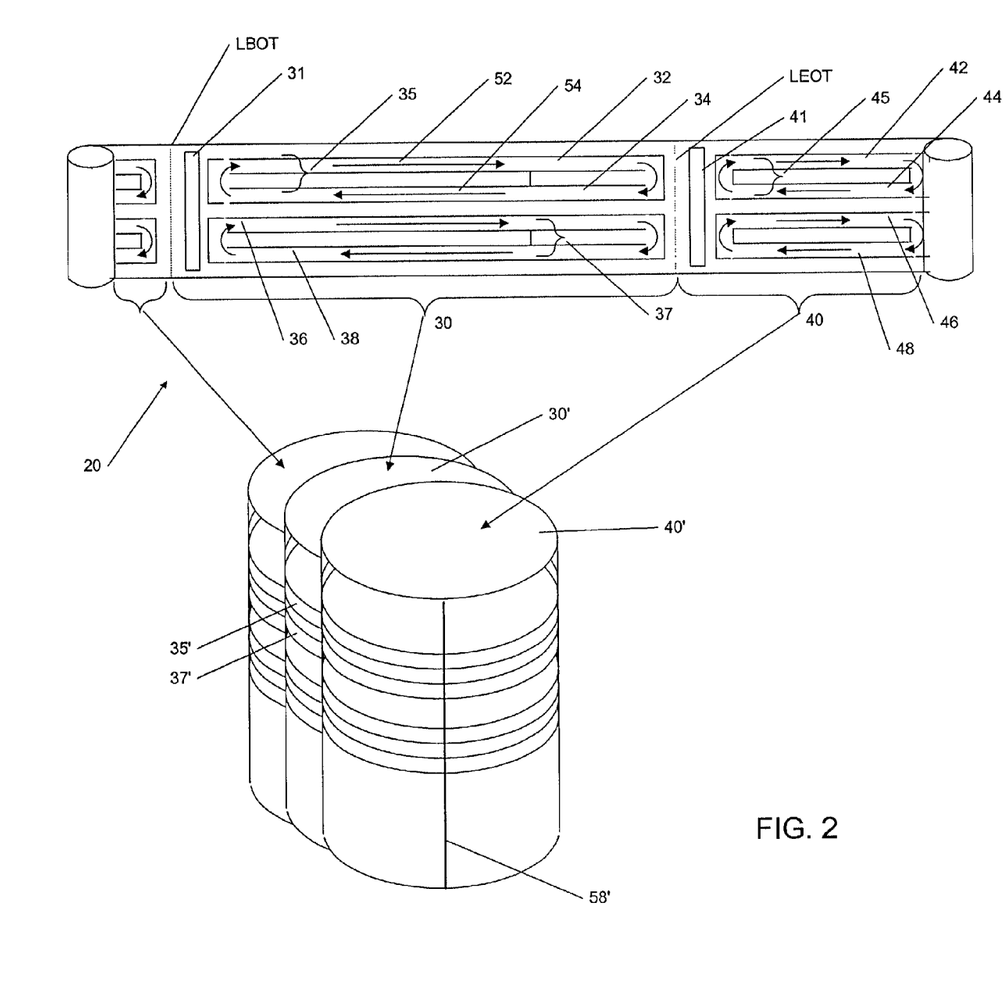
FIG. 2 depicts pictorially a method of logical cylindrical recording that stores data files as logical cylinders comprising multiple data tracks stored on a recording media.

FIG. 2 depicts one exemplary practice using logical cylindrical recording (LCR) for storing data files on a magnetic tape 20. As can be seen from a review of this figure, an LCR system can record a data file on the recording tape 20 as a closed logical track formed of two track segments. For example, the two track segments 32, 34 form a ring 35. The recording direction is indicated by arrows 52, 54. For the depicted practice, it can be seen that the track segments 32, 34 are recorded in opposite directions. However, in another practice (not shown), the track segments may also be recorded in the same direction. Each ring 35, 37, 45, 47 is associated with a respective cylinder 30, 40 of the tape. Each data file can be recorded on the tape 20 as a continuous stream of data and stored in a separate ring, i.e., at a separate location on the media and independent of other data files. The length of a cylinder 30, 40 on the tape 20 can be dynamically allocated as determined by the length of the file to be stored in the respective cylinder in a contiguous manner. For storing files having substantially the same length, such as medical image files or streamed audio and video data having a predetermined time duration, the length of the cylinders 30, 40 may be identical over the length of the tape. If the files vary in size, such as from 256 KBytes to more than 10 MBytes, then the length of the cylinder for shorter files may be selected to be less than that for longer files. Zero padding, or any other suiatble technique, can be employed for filling out extra space left in a track and not used for storing file data. It is a realization of the invention that the separation of each file from the other files on the recording media allows each file to be accessed, edited and rewritten into its prior location, without having to reorganize or rearrange the other files on the system.

The logical beginning of each cylinder LBOT may be indicated on the tape by a servo field 31 which may include file information and other information relating to the organization of the data. The logical end of each cylinder LEOT may be indicated in a similar manner. Depending on the width of the tape, a cylinder may contain between 100 and 500 rings, and each ring may store from 256 KBytes to more than 10 MBytes, depending on the size of a cylinder. The tape may have a width of between one and eight inches, and preferably, between one and five inches. A wide tape storing hundreds of data rings for each cylinder can be provided in relatively short lengths, such as between one hundred and five hundred feet. Alternatively, longer tapes having a width between one quarter inch and one inch may be employed.

The lower portion of FIG. 2 provides a visual representation of the term "logical cylindrical recording" (LCR). As seen from FIG. 2, each tape cylinder 30, 40 can be mapped on a respective physical cylinder 30', 40'. Each ring 35, 37, ... located in a tape cylinder 30 can then also be mapped on a corresponding continuous tracks 35', 37' located on the outside surface of the respective cylinder 30'. The vertical line 58' indicated on the outer surface of cylinder 40' corresponds to the bisecting axis 58 of tape cylinder 40 depicted in FIG. 3.

As can be seen from FIG. 2, the recording media 20 can store a plurality of rings 35, 37, 45, 47 organized transversely to the transport direction of the tape. Each ring can be associated with a file. The plurality of rings make up a data cylinder that can contain a plurality of different data files. A file allocation table, such as a table of inodes, or a set of segment headers 31, 41, or any other suitable mechanism, can be employed to provide a directory service that allows a user, such as a person or a computer process, to identify the data ring associated with a particular file. The file allocation table may include for each ring a directory entry "ring available", "ring used" or "ring retired (defective)".

Figure 3:
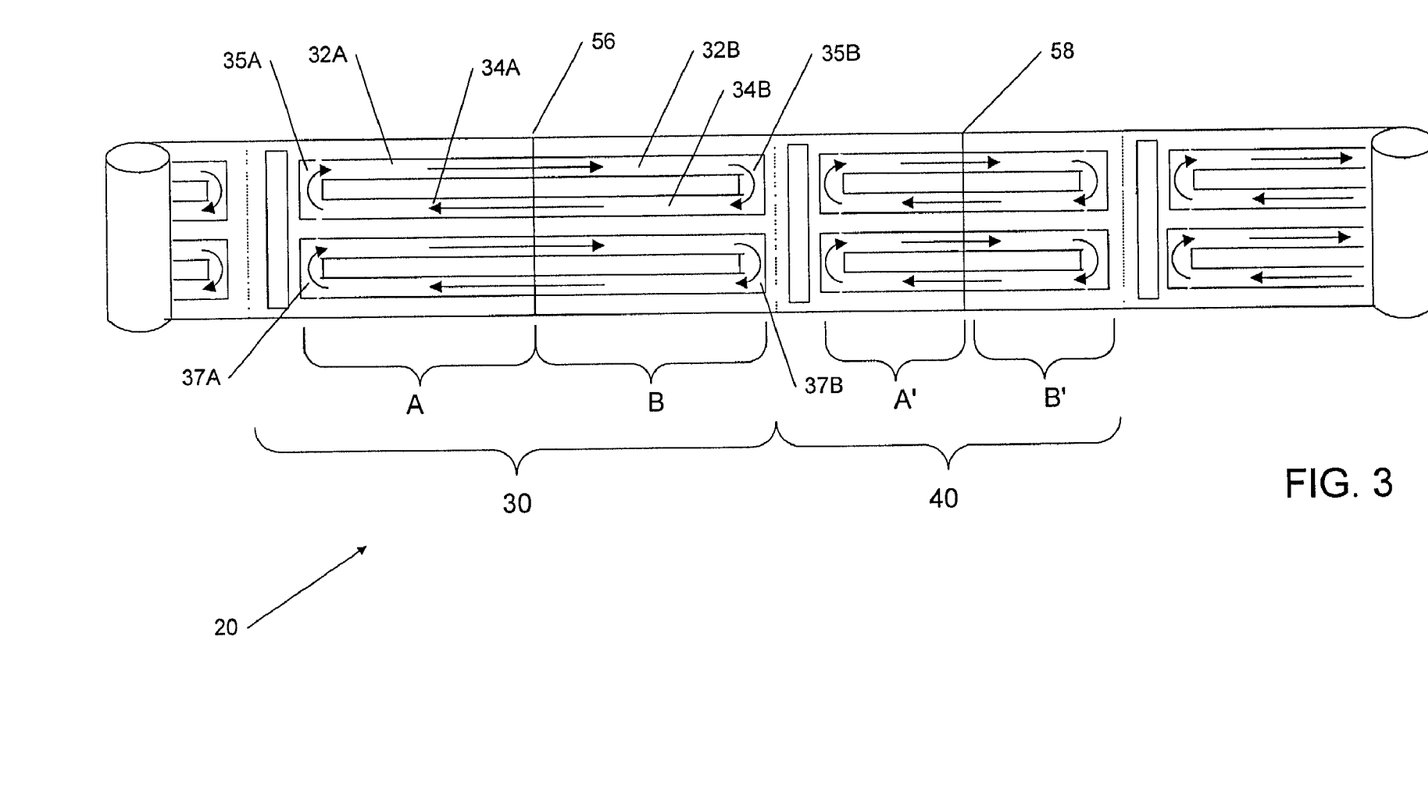
FIG. 3 depicts one embodiment of a logical cylindrical recording system wherein multiple data files are stored as logical rings on a magnetic tape.

Referring now to FIG. 3, in another embodiment of the invention, data files can be recorded on a flat recording media, such as a magnetic tape, on a logical cylinder 30, 40 in the form of closed rings. In the depicted example, however, the rings 35, 37 of cylinder 30 discussed above with reference to FIG. 2 are further subdivided into respective rings 35A, 35B, 37A and 37B, wherein each of the rings 35A, 35B, 37A and 37B may be treated by the system as a separate ring within the respective cylinder 30. The first pair of rings 35A includes a pair of linear data tracks including an upper data track 32A and a lower data track 34A. The upper data track is recorded parallel to and in the opposite direction as the lower data track. An axis 56 is depicted as bisecting the rings 35, 37, thereby subdividing the upper and lower data tracks into the pair of data rings, ring 35A and ring 35B, both of equal size. Each ring 35A, 35B takes up half of the upper and half of the lower data tracks. In one practice, rings 35A and 35B may be considered parts of a single ring 35, with a start and end position at the bisecting axis 56. In another practice, ring 35A may be associated with a first data file and ring 35B may be associated with a second data file. In operation, the tape 20 can move horizontally and vertically relative to a read/write head so that the head can access both the upper and the lower data tracks across the entire width of the tape 20, as will be discussed in more detail below. With the beginning and end points of a ring 35, 37 located near the bisecting axis 56, the read/write head moves first from a start position near the axis 56 along the 32A in a first direction indicated by arrow 52, then reverses direction at the end of cylinder 30 and moves along the lower track portions 34B, 34A in the opposite direction indicated by arrow 54, to finally return in the first direction along upper track 32A to the start position. As discussed above with reference to FIG. 2, this maps a data file onto a cylinder for LCR storage of the data file. A centerline 58' on cylinder 40' mapped to centerline 58 of tape cylinder 40 is indicated in FIG. 2. Files which are to be stored on the tape and have substantially the same length, can be stored in the same cylinder on different data rings.

In one practice, LCR may be used to store, for example, streamed video and audio files and medical and satellite images. The files tend to have a fixed size depending on the image resolution and the data compression employed. In the case of medial data, images relating to the same patient or the same practitioner and/or acquired during a predetermined time period, such as a week, month or year, may be stored in a single cylinder for easy access. Such files will rarely be edited, so that the file size remains largely unchanged, making such types of files ideal candidates for LCR data storage.

Referring back to FIG. 2, it will be understood that the recording system of the invention can be implemented on tape media that has been formed into a cylinder. The cylinder can be spun to allow a head to read or write data to the head. Additionally, it will be understood that the system can employ moveable heads that can move over the surface of a recording media to read and write data thereon. Additionally, optical systems can be employed for use with optical recording media, wherein an optical path is developed and employed that allows for simulation of cylindrical data tracks. Such optical systems can move an optical beam across continuous portions of the recording media to read or write data in long data tracks.

Figure 4:
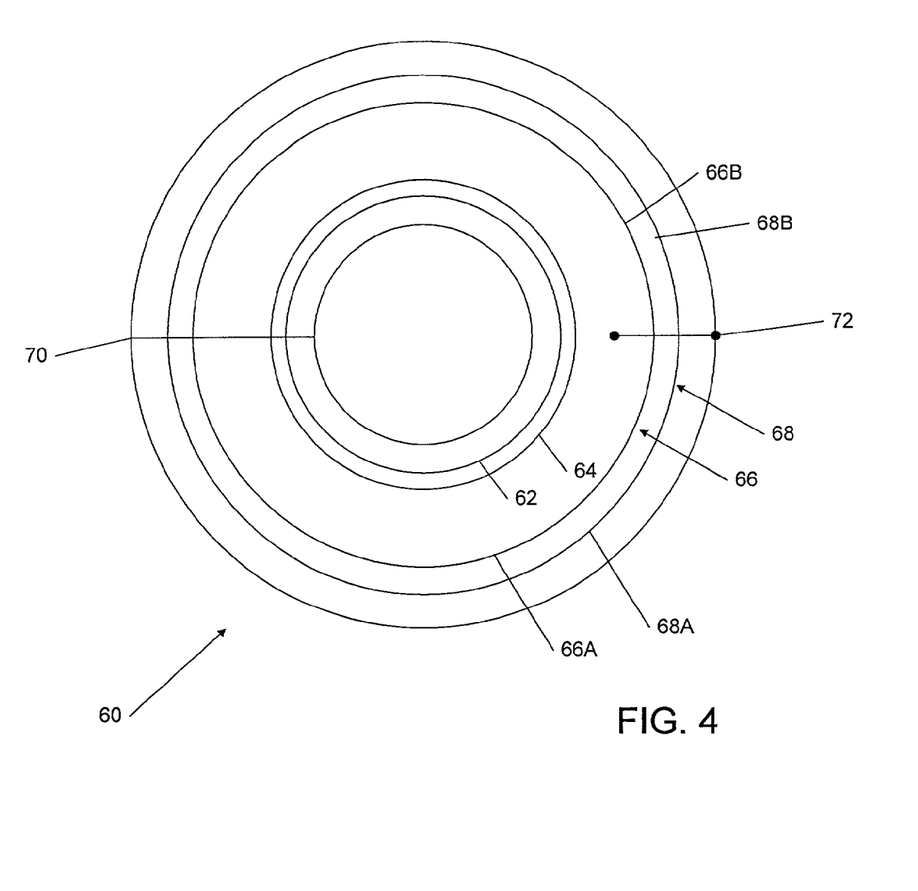
FIG. 4 depicts a further embodiment wherein data files are stored as logical rings on a disk recording medium.

Referring to FIG. 4, an alternative embodiment of an LCR system according to the invention has as a recording medium a disk 60 that can store data files in tracks 62, 64, 66, 68. Each track can be treated by the system as a ring of data and the tracks can be continuous. The beginning/end of a ring is schematically indicated by a line 70. Subsets of rings may be combined to form a cylinder. The inner tracks 62, 64 may store a single data file, whereas the outer tracks 66, 68, being longer than the inner tracks 62, 64, may be able to store two or more data files. Accordingly, the outer tracks 66, 68 may be subdivided along one or more second lines, schematically indicated with the reference numeral 72, into respective sections 66A, 66B, 68A and 68B, with each section representing a ring. The disk can be a DVD, CD-ROM, or any other suitable type of memory media.

Figure 5:
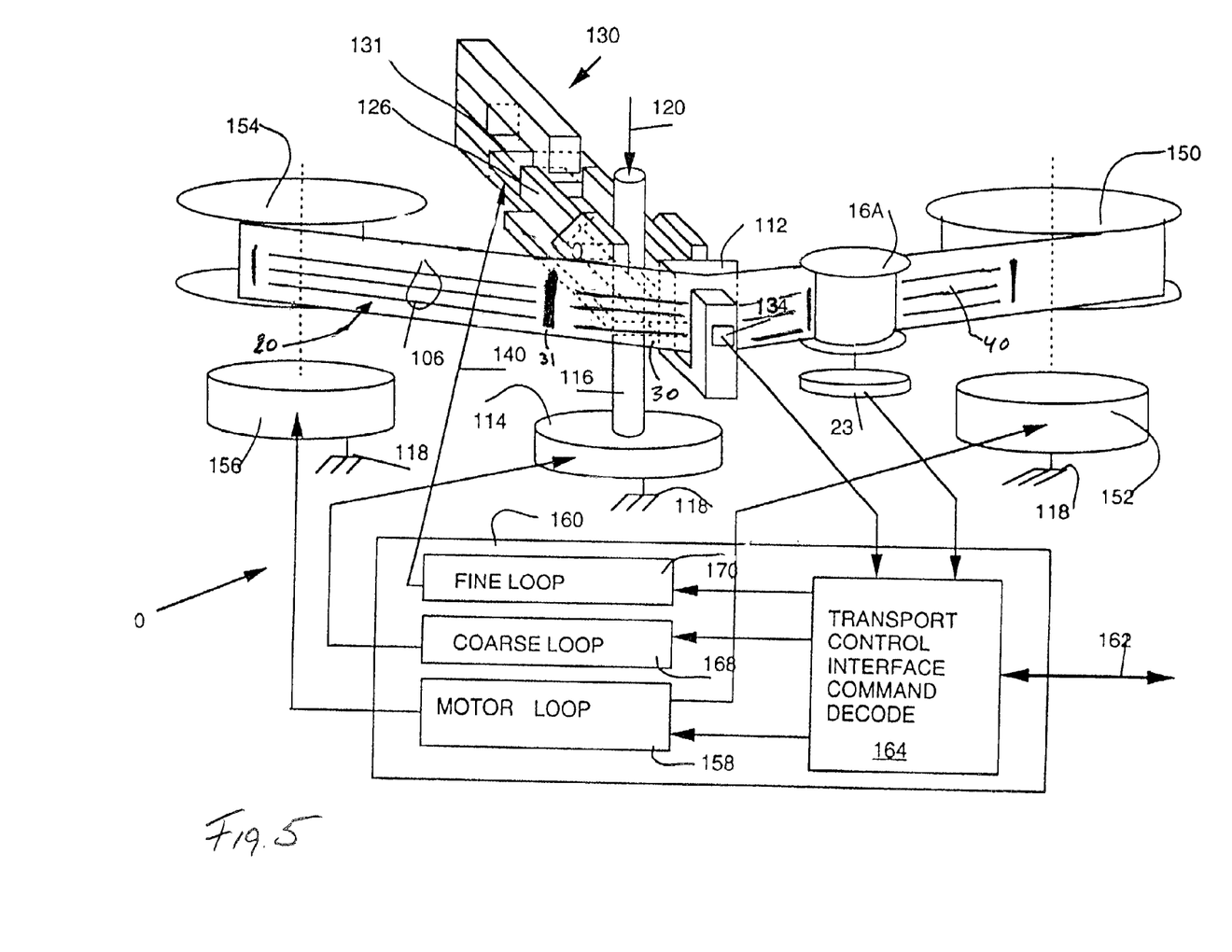
FIG. 5 depicts one system for reading and writing data to a magnetic tape having data stored thereon as logical cylinders.

Referring to FIG. 5, an exemplary system 100 for reading and writing the tape 20 illustrated in FIG. 3 includes tape reels 150, 154 onto which the tape 20 is wound, and a capstan 16A controlling the longitudinal movement of the tape 20. The reels 150, 154 and the capstan 16A are driven by one or more drive motors 152, 156, 23 in a manner known in the art. The longitudinal tape transport is controlled by a motor loop controller 158 forming a part of a control interface 160. The control interface 160 includes a transport control interface 164 which receives external signals 162 as well as servo signals 165 from a tape servo head 134 and/or speed information from a capstan motor 23, for example, via an encoder (not shown) for controlling movement of the head assembly 130 and the tape 20. The control interface may also include a data interface 165 for controlling the R/W data flow to and from the magnetic head 112 via data link 166. The R/W data may also be transmitted as part of the external signals 162. The tape 20 can be moved in either direction at a considerable linear velocity, such as 4–5 m/s. The tape servo head 134 also provides to the transport control interface 164 information about the lateral position of the tape in order to align a magnetic read/write (R/W) head 112 with the respective tracks 32, 34, . . . , 46, 48 (FIGS. 2 and 3) recorded on the tape. Specifically, FIG. 5 depicts an SDLT system that employs optically detectable servo tracks 106 recorded on one major surface of the tape which opposes the magnetic recording surface, to align a R/W head with a data track on the tape. The spacing between data tracks 32, 34 is typically between 10 and 20 µm. With the system of the invention, each track and cylinder can be accessed quickly and accurately.

The magnetic recording tape 20 can be a conventional magnetic tape. The optical servo pattern can be applied, for example by printing or embossing, during tape manufacturing. Printing may include ink jet printing, and embossing may include a mechanical process or processing with thermal and/or optical energy, for example provided by a laser. The optical servo pattern can be read by various techniques known in the art, wherein the servo signal received from the servo head 134 is processed by the control interface 164 to provide closed-loop feedback control for precisely positioning the magnetic R/W head 112 relative to each data track 32, . . . , 46.

In one embodiment, the R/W head 112 can have a predetermined alignment relative to the servo head 134. Coarse alignment between the tape 20 and the R/W head 112 can be provided by a coarse head positioner 116 which can be implemented, for example, by a lead screw 120 driven by a head positioning motor 114 which is controlled by a coarse loop controller 168 of the control interface 164. Fine positioning is provided by, for example, a fine positioner 130 actuated by, for example, a voice coil 131 or a piezoelectric element (not shown). Head control mechanisms of this type are known in the art.

Referring also back to FIGS. 2 and 3, during an LCR read and/or write operation, the exemplary cylinder 30 may be selected for reading data from or writing data to the tape 20. If the tape section containing the cylinder 30 is wound on reel 150, then the tape 20 is rapidly advanced to the respective cylinder 30. One of two situations may occur: Either cylinder 30 is a new cylinder, i.e., no data have previously been written on the tape corresponding to cylinder 30 and any subsequent cylinders 40, or cylinder 30 has previously be defined and used, but has rings available. If cylinder 30 is a new cylinder, then the length of cylinder 30 is dynamically allocated depending on the size of the data file to be written. The physical length of new section 30 may be selected to be somewhat greater than the number of bytes in the data file divided by the twice the number of bytes that can be stored per unit length of the tape track. The exact number of bytes that can be stored per unit length will depend on such parameters as the type of media and the R/W head characteristics. The data file will then be written consecutively on the first ring 35 of cylinder 30, with approximately half the file written in a first recording direction indicated by arrow 52, and the rest of the file written in a second recording direction opposite to the first recording direction as indicated by arrow 54. If, on the other hand, the cylinder 30 already contains rings 35 that are used, but has more rings available, for example ring 37, then a file having substantially the same file size as the file of ring 35 may be written to the subsequent ring 37, as discussed above.

The process of reading a file is carried out in a similar fashion. The tape 20 is moved to the selected cylinder 30 and the R/W head 112 is positioned relative to the desired ring 35 in response to signals received from the servo head 134. Starting either proximate to the servo field 31 or near the centerline 56, the tape 20 is first moved to the left (arrow 52) to read the upper track 32 and then reversed (arrow 54) to read the lower track 34 of ring 35, or vice versa. With a ring structure according to the embodiment illustrated in FIG. 3, the tape 20 may be advanced to the midpoint 56 between rings A and B, and the file may be written to or read from tracks 32A, 34A or 32B, 34B, respectively, in the manner described above.

Although the above description describes certain embodiments of systems that can employ logical cylindrical recording of data, it will be apparent to those of skill in the art that the described systems can be modified and adapted for other applications and for use with other recording media, and that these other systems will fall within the scope of the invention.

I claim:

1. A method of configuring a tape storage medium for recording a data file having a finite size, comprising:
    defining a logical cylinder on said tape storage medium, the tape storage medium comprising a single magnetic tape, said logical cylinder comprising at least one storage ring and being located entirely on a portion of the magnetic tape; and
    recording, on the at least one storage ring, said data file;
    wherein a length of said logical cylinder is dynamically allocated based on a size of the data file.

2. The method of claim 1, wherein the length of said logical cylinder is selected so that substantially one half of data selected from the data file is recorded in a first longitudinal direction of movement of the tape storage medium with respect to a recording head, and remaining data is recorded in an opposite longitudinal direction of movement of the tape storage medium with respect to the recording head.

3. The method of claim 2, wherein said the data recorded in the first longitudinal direction comprises data selected from a beginning portion and an end portion of the data file.

4. The method of claim 1, wherein the logical cylinder comprises a plurality of storage rings, and wherein different data files having substantially a same size as the size of the data file are stored in different storage rings of a same logical cylinder.

5. The method of claim 1, wherein recording includes tracking a servo track disposed on the tape storage medium and aligning a recording head with said storage ring based on said tracking.

6. The method of claim 1, wherein information about the logical cylinder and the at least one storage ring is recorded on the tape storage medium.

7. The method of claim 1, wherein respective data files are associated with respective single storage rings.

8. A magnetic tape data storage system for storing a data file, comprising:
    a single magnetic tape having a longitudinal recording direction and a plurality of transversely spaced logical tracks;
    at least one logical cylinder extending along the longitudinal recording direction of the single magnetic tape and being located entirely on a portion of the single magnetic tape; and
    at least one data storage ring located entirely within a logical cylinder, said data file being recorded entirely on a single data storage ring.

9. The magnetic tape data storage system according to claim 8, wherein a longitudinal extent of the logical cylinder is dynamically allocated based on a size of the data file.

10. The magnetic tape data storage system according to claim 8, wherein the single data storage ring comprises at least two of the transversely spaced logical tracks and the transversely spaced logical tracks of the single data storage ring are recorded in opposite recording directions.

11. The magnetic tape data storage system according to claim 8, wherein the single data storage ring stores an identification field and a data storage field.

12. The magnetic tape data storage system according to claim 11, wherein the identification field is recorded on a magnetic recording surface of the single magnetic tape.

13. The magnetic tape data storage system according to claim 8, wherein each data storage ring can store in excess of 256 KBytes.

14. The magnetic tape data storage system according to claim 8, wherein the single magnetic tape is between one and eight inches wide.

15. The magnetic tape data storage system according to claim 8, wherein the single magnetic tape also includes an optically detectable servo track disposed thereon.

16. A method of storing, on a single storage medium, a data file of finite size, comprising:
   determining a size of the data file;
   determining, from the size of the data file, a length of a storage ring on said single storage medium for recording said file on said storage ring; and
   defining, on said single storage medium, a logical cylinder to accommodate said storage ring on said logical cylinder, the logical cylinder being located entirely on a portion of the single storage medium.

17. The method of claim 16, wherein said storage ring comprises two substantially parallel logical tracks, with the logical tracks being recorded in opposite recording directions.

18. The method of claim 16, wherein said single storage medium comprises logical tracks arranged in a circular pattern, and wherein a contiguous portion of said circular pattern defines the storage ring.

19. The method of claim 18, wherein said single storage medium is a magnetic disk.

20. The method of claim 18, wherein said single storage medium is a cylinder having a magnetic recording surface.

21. A data storage device comprising:
   a recording head assembly having a recording head and a servo head operatively connected to the recording head;
   a recording medium capable of being positioned relative to the recording head assembly for recording data in a longitudinal recording direction; and
   a control interface for receiving data of a file to be recorded on the recording medium and positioning information for positioning the recording medium relative to the recording head assembly;
   wherein said file data is recorded on said recording medium as a logical ring located within a logical cylinder spanning a finite length on the recording medium, with all data for the file being stored in a single logical ring on a single recording medium, the logical cylinder being located entirely on a portion of the single recording medium.

22. The data storage device of claim 21, wherein the recording medium is a magnetic tape.

23. The data storage device of claim 22, wherein the logical ring is defined by at least two logical tracks disposed within the logical cylinder.

24. The data storage device of claim 23, wherein the logical tracks are recorded in opposite longitudinal recording directions.

25. The data storage device of claim 21, wherein the recording head is positioned in response to position information transmitted by the servo head to the control interface.

26. A method of recording a data file as a logical ring on a single recording medium, comprising:
   determining a file size of the data file;
   determining a ring size of the logical ring based on said file size;
   defining, on said single recording medium, a logical cylinder to contain said logical ring, the logical cylinder being located entirely on a portion of the single recording medium; and
   recording said data file in its entirety within said logical ring.

27. The method of claim 26, wherein an additional data file having substantially a same file size as the data file is recorded entirely on an additional logical ring located in the logical cylinder.

28. The method of claim 26, wherein the single recording medium is a magnetic tape and recording further comprises:
   detecting a last one of previously recorded logical cylinders;
   positioning a head assembly having a recording head in an area of the magnetic tape past an end indicator of a last previously recorded logical cylinder; and
   moving at least one of the magnetic tape and the recording head relative to each other to record the data on at least two parallel logical tracks within the logical cylinder.

29. The method of claim 28, wherein the at least two parallel logical tracks are recorded in opposite recording directions.

30. The method of claim 28, wherein the at least two parallel logical tracks are recorded in the same recording direction.

31. The method of claim 26, wherein the recording medium is a magnetic disk and defining a logical cylinder includes allocating, on the magnetic disk, a contiguous circular recording track capable of recording said data file as a contiguous logical track.

* * * * *